United States Patent
Bigelow et al.

(10) Patent No.: US 6,878,068 B2
(45) Date of Patent: Apr. 12, 2005

(54) UNIVERSAL JOINT ADAPTER RING

(75) Inventors: Vaughn Bigelow, Lafayette, CO (US); Timothy Fisher, Alexandria, MN (US); Marvin Hoffman, Alexandria, MN (US)

(73) Assignee: Bigelow Group, Boulder, CO (US)

(*) Notice: Subject to any disclaimer, the term of this patent is extended or adjusted under 35 U.S.C. 154(b) by 0 days.

(21) Appl. No.: 10/396,739

(22) Filed: Mar. 25, 2003

(65) Prior Publication Data

US 2004/0157668 A1 Aug. 12, 2004

Related U.S. Application Data

(60) Provisional application No. 60/445,982, filed on Feb. 7, 2003.

(51) Int. Cl.7 ............................................... F16D 3/50
(52) U.S. Cl. ........................................ 464/126; 464/905
(58) Field of Search .......................... 464/70, 119, 125, 464/126, 130, 182, 905; 403/49, 57, 58, 74, 186, 391, 396, 398, 399

(56) References Cited

U.S. PATENT DOCUMENTS

| | | | |
|---|---|---|---|
| 896,195 A | * 8/1908 | Bogart | 464/126 |
| 1,162,885 A | 12/1915 | Sponsel | |
| 1,166,064 A | * 12/1915 | Linnan | 464/125 |
| 1,223,524 A | * 4/1917 | Rosenberg | 464/171 |
| 1,250,349 A | * 12/1917 | Perkins | 464/12 |
| 1,273,289 A | 7/1918 | Urschel | |
| 1,411,468 A | * 4/1922 | Wood | 464/102 |
| 1,868,282 A | 7/1932 | Feightner | |
| 1,887,793 A | 11/1932 | Williams | |
| 1,939,222 A | 12/1933 | Othmer | 260/134 |
| 2,253,300 A | * 8/1941 | Karlberg | 464/130 |
| 2,336,579 A | * 12/1943 | Venditty et al. | 464/70 |
| 4,643,699 A | * 2/1987 | Taig | 464/112 |
| 5,094,651 A | 3/1992 | Cornay | 464/12 |
| 5,277,659 A | 1/1994 | Cornay | 464/12 |
| 5,425,676 A | 6/1995 | Cornay | 464/11 |
| 5,823,881 A | 10/1998 | Cornay | 464/118 |
| 6,251,020 B1 | 6/2001 | Cornay | 464/117 |

* cited by examiner

Primary Examiner—Kenn Thompson
(74) Attorney, Agent, or Firm—Marsh Fischmann & Breyfogle LLP

(57) ABSTRACT

The present invention relates to a ring member of a ring-type universal joint utilized for transferring rotary motion from a first shaft to a second shaft. The ring member includes a plurality of circumferentially spaced openings for receiving outwardly extending torque transfer elements associated with the first and second shafts. One or more of these openings are separable to facilitate connection of the first and second shafts. In this regard, the separable bores are formed partially within the ring member and partially within a retaining member interconnectable to the ring member. This allows for disposing a torque transfer element within a portion of the bore formed on the ring member and then interconnecting the retainer over that element. In one embodiment, the, retaining members for first and second opposing pairs of bores interconnect to opposite sides of the ring member allowing individual interconnection of the shafts to the ring.

26 Claims, 6 Drawing Sheets

UNIVERSAL JOINT ADAPTER RING

CROSS REFERENCE TO RELATED APPLICATIONS

This application claims priority under 35 U.S.C. 119(e)(1) to a U.S. Provisional Application No. 60/445,982 entitled: "Universal Joint Adapter Ring," filed on Feb. 7, 2003; the contents of which are incorporated herein as if set forth in full.

FIELD OF THE INVENTION

The present invention relates to ring-type universal joint structures for transferring rotary motion and associated torque from a first shaft to a second shaft while permitting relative movement therebetween. More particularly, the present invention is directed to a solid ring member having a plurality of circumferentially spaced openings wherein one or more of these openings are accessible, with the ring in operating position between the first and second shafts, to facilitate connection of the first and second shafts.

BACKGROUND

Rotating shafts are commonly utilized to transmit mechanical energy between power sources and power outputs. In many instances, a power source and output cannot be accurately aligned, or, these components move relative to one another during operation. In this regard, separate shafts may be connected to each component and these shafts may be interconnected with a universal joint capable of transmitting rotation from one shaft to the other when the shafts are not coaxially aligned.

A common universal joint includes a pair of U-shaped yoke members with their midpoints attached to the end of first and second shafts. The open ends of the two U-shaped yokes are positioned in a facing relationship and rotated 90° relative to one another. A cruciform connecting member extends between the legs of each U-shaped yoke. This cruciform connecting member includes four radially extending torque-bearing elements each of which may further include a bearing lined cap. Accordingly, when opposing torque bearing elements are interconnected to a U-shaped yoke, a pivotal connection is formed between the cruciform member and the shaft associated with the U-shaped yoke.

One drawback of this type of universal joint is that the internal connection geometry of the cruciform connector allows a limited range of movement between the rotational axes of the two shafts. Another drawback is the loss of rotational efficiency as the angle between the rotational axes of the two shafts increases. In this regard, as the angle between the shafts increases, a driven shaft may rotate at a pronounced non-constant velocity relative to a diving shaft, causing undesirable vibration. Furthermore, when subject to high loads, the cruciform member is susceptible to cracking between adjacent ones of the torque bearing elements due to high stress concentrations.

In order to alleviate one or more of the problems associated with cruciform-type universal joints, these joints may sometimes be replaced with ring-type universal joints. Like cruciform-type joints, ring-type joints are utilized to pivotally interconnect yoke members (e.g. U-shaped or T-shaped) attached to the ends of first and second shafts. However, as opposed to utilizing a connecting member that extends between the open ends of the yokes, an annular ring surrounds the end of each of these yokes. This annular ring will typically include four radial bores spaced at 90° intervals around its circumference for receiving torque transfer elements (i.e. trunnions) extending outward from each yoke. These trunnions may also include a bearing lined cap. When the yoke is connected to the ring member, a pivotal connection is formed between the ring member and the shaft associated with the yoke.

Due to their annular geometry, ring-type universal joints allow for greater movement between the rotational axes of the two shafts while reducing vibration. Additionally, these rings eliminate the stress concentration problem associated with cruciform members. This enables transmission of increased loads between the shafts. While allowing a greater range of movement between the shafts and providing strength benefits, ring-type joints are typically difficult to install and/or service. In this regard, the opposing trunnions of the yokes are typically press fit into the radial bores in the ring. This generally requires removing each shaft from its respective component. In some instances, split annular members or "rings" are utilized wherein each half of the ring forms one half of each of the radial bores. These split rings require simultaneous connection of the shafts. Additionally, this split design reduces the bearing strength of the ring.

SUMMARY OF THE INVENTION

It is therefore an object of the present invention to provide a continuous ring member for a ring joint assembly that facilitates interconnection with opposing shafts while maintaining enhanced strength characteristics.

It is a further objective to provide the ring type joint for replacing cruciform-type joints.

The present invention is directed towards an improved ring apparatus for use in ring-type universal joints that transfer rotary power from a first shaft to a second shaft. In particular, the ring apparatus includes a continuous annular member having one or more separable radial bores for receiving torque transfer elements (hereinafter "trunnions") extending outward from yoke members associated with the first and second shafts. In this regard, the separable bores are formed partially within the annular member and partially within a retaining member (i.e. retainer) that is interconnectable to the annular member. As will be appreciated, this allows for disposing a trunnion within a portion of the bore formed on the annular member and then interconnecting the retainer over that trunnion element. In this regard, the need to press fit each trunnion within the annular member is eliminated. Furthermore, the separable bores may be formed such that each shaft may be individually interconnected to the annular member. That is, the present invention provides a partially separable ring apparatus that does not require simultaneous connection to opposing shafts.

According to a first aspect of the present invention, a ring apparatus for use in a ring type universal joint is provided that allows for individual interconnection of first and second shafts. The apparatus includes an annular member at least partially defining first and second pairs of opposing radial bores wherein at least one bore of each opposing pair is a separable bore. The apparatus further includes first and second retaining members that are interconnectable with the annular member. When connected to the annular member, these retaining members, in combination with the annular member, define the apertures of the separable bores. Preferably, the first and second retaining members interconnect to opposing sides of the annular member to define their respective bores. This provides increased accessibility to each pair of opposing radial bores, which allows individual interconnection of the annular member to the first and shafts.

That is, opposing trunnions of a first shaft may be disposed into a first pair of the opposing bores from a first side of the annular member and opposing trunnions of a second shaft may be disposed into a second pair of the opposing bores from a second side of the annular member. In this regard, the opposing design allows the ring apparatus to be applied to or removed from the shafts while the shafts are in place (e.g. in a drive linkage).

The continuous annular member has a circumferentially continuous wall that surrounds the axis of rotation of the first and second shafts when trunnions on those shafts are interconnected within the radial bores. That is, the annular member defines an aperture sized for receiving the ends of the first and second shafts. This aperture may be sized to allow for enhanced movement between the shafts, e.g., a larger aperture to allow for an enhanced range of movement therebetween. Likewise, the circumferentially continuous wall may have width and thickness dimensions selected in accordance with strength requirements for a particular application. Finally, it will be appreciated that various materials may be utilized to form the annular member. For example, when utilized in automotive drivelines or other high-stress applications, these annular members will typically be formed of metals and/or metal alloys (e.g., steel, aluminum, etc.) However, it will be appreciated that for other applications a variety of materials may be utilized, including, without limitation, plastics, rubbers, porcelain, fiberglass and composite materials.

The annular member will typically have a substantially circular cross-section as viewed relative to an axis of rotation extending through its central aperture. However, as used herein the term annular member is meant to include any shape defining a continuous ring forming an aperture. For example, the ring member may be square, hexagonal, octagonal, or otherwise shaped so long as it provides an aperture for receiving the ends of the first and second shafts while providing adequate structure for forming opposite radial bores to receive trunnions associated with those shafts.

The opposing pairs of radial bores form pivotal connections with the first and second shafts when connected thereto. In this regard, each opposing pair of radial bores defines a pivot axis. In one embodiment, two pairs of opposing bores define two pivot axes. In this embodiment, the pivot axes are transverse (e.g., perpendicular) and coplanar for balance purposes. However, it will be appreciated that in some embodiments, three or more pairs of opposing bores may be utilized defining three or more transverse pivot axes that may or may not be coplanar.

As noted, each separable bore is partially formed within the annular member and partially formed within the retaining member. Typically, the retaining member and the annular member will each form one-half of each separable radial bore. In this regard, when the retaining member is removed from the annular member a torque transfer element may be placed within the "open" radial bore. After placement of the torque transfer element, the retaining member may be interconnected to the annular member, thereby clamping the torque transfer element within the radial bore. In this regard, the separable bores allow for lateral placement of a torque transfer element therein as opposed to axial insertion (e.g., press fitting). However, it will be appreciated in some instances that the annular member and/or the retaining member may define less than half of the radial bore. That is, while neither component will define over half of a radial bore in order to allow lateral placement of a torque transfer element therein, each component may define less than half of the radial bore. In this regard, the radial bore may not be continuous about its circumference.

The radial bores are typically each sized to matingly receive cylindrical torque transfer elements associated with the first and second shafts. Typically, these cylindrical elements will be trunnions disposed on the ends of each shaft that may include a bearing lined cap for rotational purposes. In this regard, each bore may be sized slightly smaller than the outside diameter of the bearing cap in order to apply a predetermined clamping force to that bearing cap. As will be appreciated, this provides a secure attachment between the bearing cap and the radial bore while allowing the trunnion disposed therein to pivot freely. Furthermore, the predetermined clamping force may be utilized to adjust the shape of the bearing cap. As may be appreciated, bearing caps formed from a drawing process may be slightly elongated. Accordingly, the bore defined by the retainer and annular member may be used to form the bearing cap to a more circular shape, thereby enhancing trunnion pivoting.

In one embodiment, each pair of opposing radial bores includes one separable bore and one bore wholly formed within the annular member. In this regard, a shaft having opposing trunnions may have a first trunnion axially disposed into the wholly formed bore within the annular member, after which the second trunnion may be clamped between the annular member and the retaining member that form the opposing radial bore.

In another embodiment, each radial bore in the annular member is a separable radial bore. In this regard, each separable radial bore may require its own retainer. Alternatively, each pair of separable and opposing radial bores may utilize a single retainer that in conjunction with the annular member defines a pair of opposing radial bores. For example, each retaining member may also be an annular member having portions of the opposing radial bores formed therein. These annular retainers may be designed to attach to opposing side surfaces of the main annular member. In this regard, the apparatus may be formed of three or more stacked rings.

In a further embodiment, each radial bore will further comprise a stop means for maintaining the trunnion disposed therein at a desired location. In this regard, each radial bore may, towards its outer edge as measured from a rotational axis of the annular member, include a section having a reduced diameter relative to the main part of the radial bore. That is, each radial bore may include a lip or rim around all or a portion of its circumference that prevents a trunnion disposed therein from passing that point. As will be appreciated, this rim may be an integrally formed portion of the radial bore, providing for simplified construction of the ring member. Alternatively, a groove may be formed within the circumference of the radial bore for receiving a snap ring that likewise prevents axial movement of a trunnion member disposed within the radial bore.

The retainers may be interconnected to the annular member in any appropriate fashion. Preferably, the retainers are removeably interconnected utilizing a mechanical affixer, such as a bolt or screw. However, it will be appreciated that more permanent methods of interconnecting the retainer to the annular member may also be utilized, such as, welding, rivets, and/or key locks. To enhance the strength of interconnection between the retainers and annular member, the interface surfaces of these components may have interlocking members (e.g., a sliding engagement means).

According to a second aspect of the present invention, a ring apparatus is provided that utilizes one or more separable bores, wherein the separable bores are formed to lessen their effect on the bearing strength of the ring apparatus. In this regard, the ring apparatus includes a continuous annular member that at least partially defines first and second pairs of opposing radial bores for receiving torque transfer elements associated with first and second shafts. One or more of the bores is a separable bore wherein an interconnectable retaining member and the annular member in combination define that bore. In order to maintain a high degree of structural integrity for transferring loads, the interface surface(s) between the retaining member and the annular member is transverse relative to a rotational plane through which the annular member rotates when interconnected to first and second rotating shafts. In this regard, an enhanced portion of loads (e.g., torque) transmitted between the shafts may be concentrated within a continuous circumferential wall of the annular member as opposed to being concentrated in the mechanical connectors (e.g., bolts) used to interconnect the retaining member(s) to the annular member. That is, use of a transverse interface surface between the retaining member(s) and the annular member lessens the forces applied to the mechanical connectors utilized to interconnect the retaining member(s) to the annular member. Accordingly, this increases the maximum allowable bearing strength of the separable bore ring apparatus.

For each separable bore, there will typically be at least two interface surfaces between the corresponding retaining member and annular member, which define that bore. Accordingly, one or both of these surfaces will include at least a portion that is transverse to the rotational plane of the annular member in order to enhance load transfer between the retaining member and the annular member. Furthermore, the interface surface(s) on the retaining member and the mating interface surface(s) on the annular member may be contoured (e.g., non-planar) such that additional forces may be transmitted therebetween. For example, an interface surface on the retaining member may include one or more projections while the corresponding interface surface of the annular member contains one or more mating recesses. These projections and recesses may be utilized to align the retaining member relative to the annular member for interconnection thereto as well as to enhance the bearing strength between these members.

While at least one of the radial bores of the present aspect is a separable bore, one or more of the remaining bores may be integrally formed within the annular member. For example, one of the pairs of opposing radial bores may be integrally formed within the annular member while a second pair of opposing bores each comprise separable bores. Alternatively, all the bores may be separable bores, wherein retaining members of a first pair of bores interconnect to a first side of the annular member and retaining members a second pair of bores interconnect to a second side of the annular member. What is important is that any separable bore will include a transverse interface surface(s) (i.e., relative the rotational plane of the annular member) between the retaining member and annular member, to reduce the structural effect of the separable bore on the overall bearing strength of the annular member.

DETAILED DESCRIPTION

The present invention is directed towards a ring-type universal joint for transferring rotary motion from a first rotating shaft to a second rotating shaft. In particular, the invention is directed towards an improved ring design that facilitates the interconnection of the first and second shafts. In the following description, one embodiment of the invention is set forth in the context of replacing a cruciform-type universal joint assembly with a ring-type universal joint assembly. It will be appreciated, however, that certain aspects of the invention are not limited to such applications.

Figure 1A:
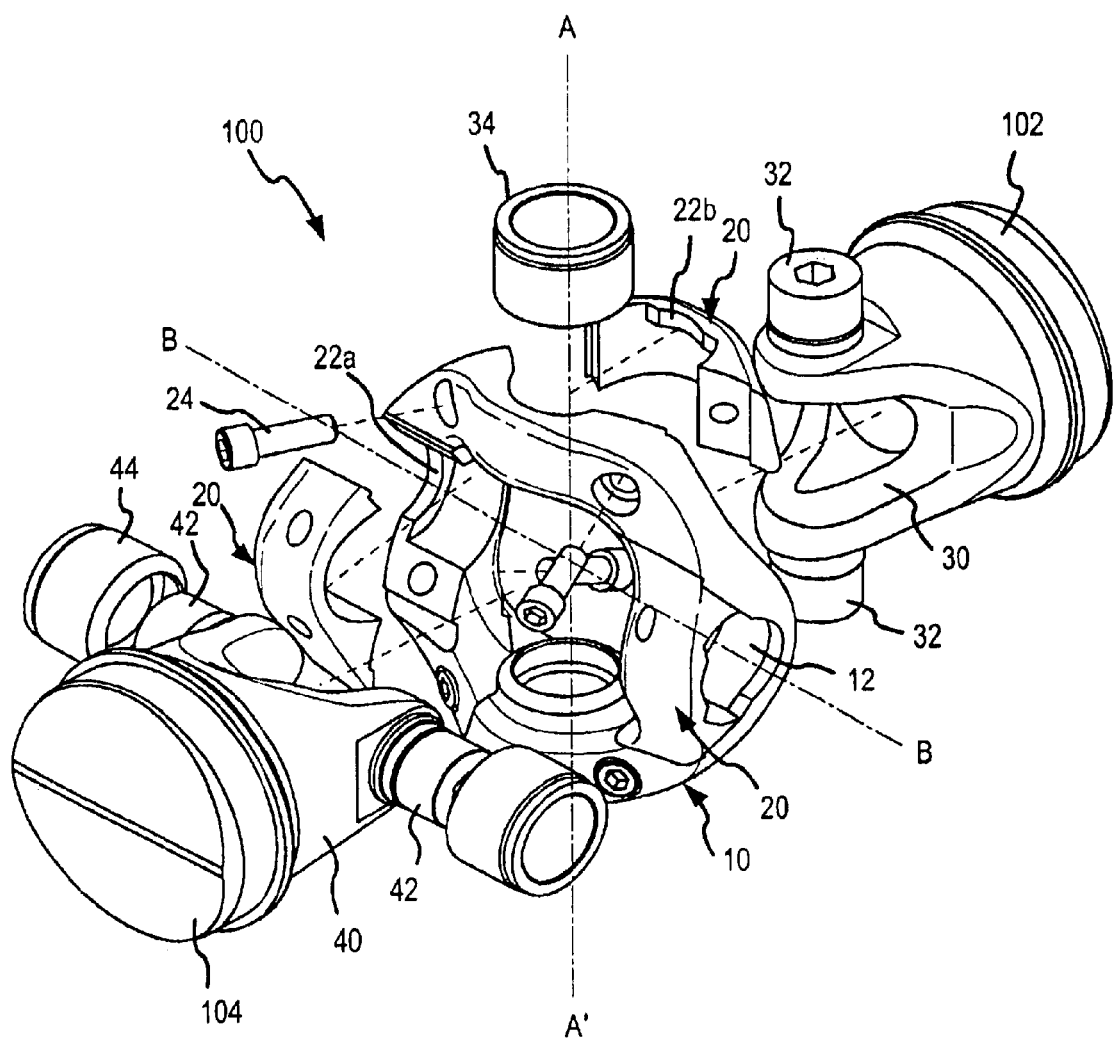
FIGS. 1A and 1B show exploded perspective and perspective views of the present invention.
Figure 1B:
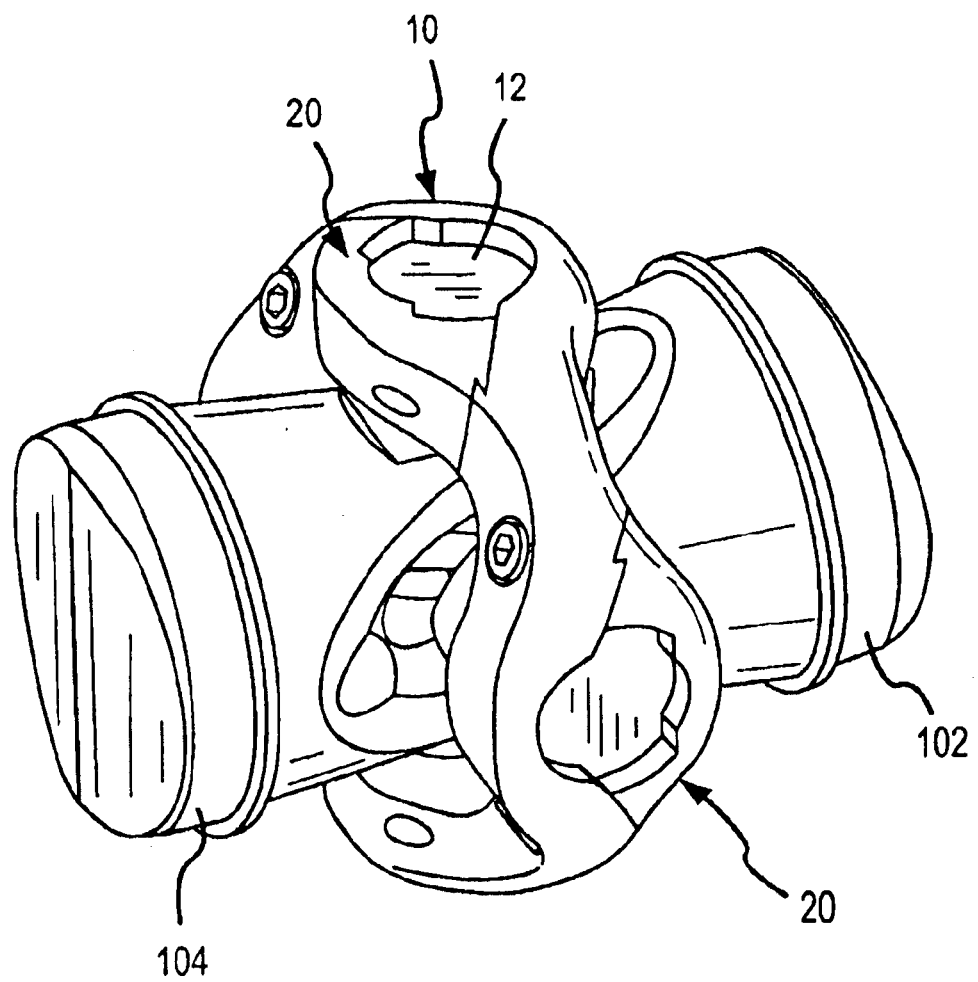

FIGS. 1A and 1B show an exploded perspective view and perspective view, respectively, of a ring-joint assembly 100 interconnecting first and second shafts 102, 104. As shown, ring-joint assembly is a flexible coupling that facilitates transfer of a rotary torque between first and second shafts 102, 104 wherein the rotational axes of those shafts may be out of alignment with each other, and/or move relative to one another in conjunction with rotating.

The ring joint assembly 100 utilizes a ring member 10 to interconnect first and second shafts 102, 104. The ring member 10 includes four radial bores 12, equally spaced about its circumference for receiving torque-transfer elements on the first and second shafts 102, 104, as will be discussed herein. The four radial bores 12 extend through a continuous circumferential wall of the ring member 10. A first pair of radial bores 12 defines a first pivot axis A-A', while a second pair of the bores 12 define a second pivot axis B-B'. In the embodiment shown, these pivot axes A-A' and B-B' are perpendicular and coplanar, defining a central reference plane for the ring member 10.

As shown, each of the four equally spaced radial bores 12 is only partially formed within the ring member 10. In particular, a first portion of each radial bore 12 is formed within the ring member 10 while a second portion of each radial bore 12 is formed within a retainer 20 interconnectable to the ring member 10. In this regard, each radial bore 12 is separable. This allows insertion of a torque-transfer element associated with each shaft 102, 104 into the portion of the radial bore 12 defined by the ring member 10 while the retainer 20 is removed, as will be discussed herein.

Figure 2A:
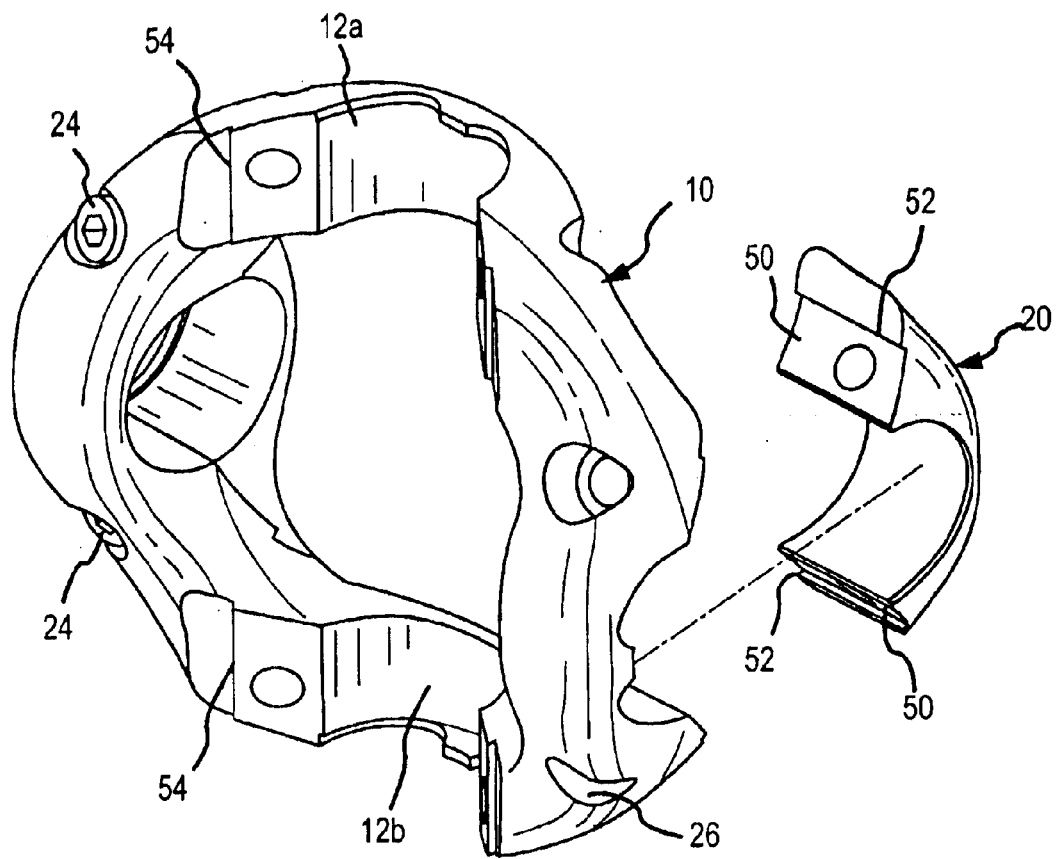
FIGS. 2A and 2B show a perspective view and plan end view of one embodiment of the invention.
Figure 2B:
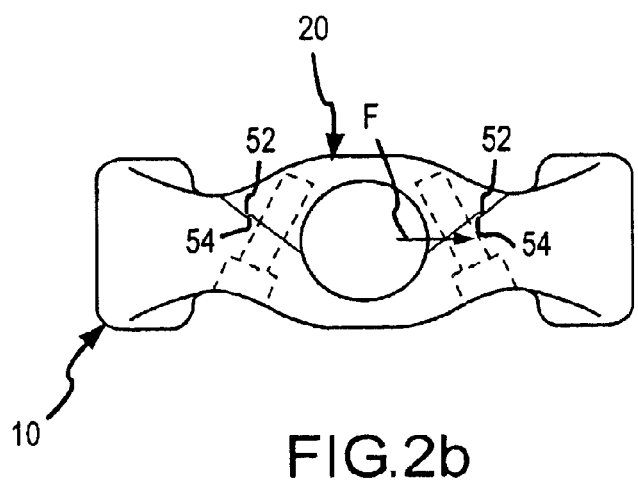

In the embodiment shown, four retainers 20 are interconnected to the ring member 10 to define the four radial bores 12. These retainers 20 are interconnected to the ring member 10 utilizing two bolts 24 (i.e. one on either side of the radial bore 12). As shown in FIGS. 2A and 2B, these bolts 24 pass through the ring member 10 and their respective retainers 20 at an angle in order to enhance threaded engagement therebetween. It will be appreciated that the bolts 24 may extend through the retainers 20 and into the ring member 10 as well. It will be noted that the heads of each bolt 24 are received within counter-sunk recesses 28 within the ring member 10. In this regard, when the retainers 20 are interconnected to the ring member 10, the head of each interconnecting bolt 24 is received within a recess 28 such that it does not extend above the surface of the ring member 10. This allows for enhanced clearance for the ring member 10 as well as improved ring balance.

The end of each shaft 102, 104 includes a trunnion yoke 30, 40, respectively, for interconnection within the radial bores 12 of the ring member 10. Each of these trunnion yokes 30, 40 is substantially T-shape and includes opposing torque-transfer elements or trunnions 32, 42. These trunnions 32, 42 are cylindrical surfaces having an axis that extends in a radial direction perpendicular to the rotational axis of the shaft to which it is attached.

In order to create a pivotal connection with the ring member 10, the trunnions 32, 42 of each trunnion yoke 30, 40 are each received within bearing caps 34, 44. These bearing caps 34, 44 typically include needle bearings lining their inside surfaces. Accordingly, the outside surface of the bearing caps 34, 44 are sized for receipt within the radial bores 12 of the ring member 10. As shown in FIG. 1B, once assembled, each shaft 102, 104 is pivotally interconnected to the ring 10 about one pivot axis. In particular, the first shaft 102 is pivotally interconnected to the ring member 10 about a first pivot axis A-A' and the second shaft 104 is pivotally interconnected to the ring member 10 about a second pivot axis B-B'. As will be appreciated, once the shafts 102, 104 are interconnected via the ring member 10, the shafts 102, 104 have two rotational degrees of freedom relative to one another, thereby allowing the shafts to rotate about non-aligned axes of rotation.

As shown in FIG. 1A, each radial bore 12 includes a retention lip 22. This lip 22 may be formed continuously around the circumference of the radial bore 12 or, partially formed about the circumference. As shown in FIG. 1A, a first portion of one lip 22A is shown as being continuous about the portion of a radial bore 12 formed on the ring member 10. In contrast, the lip 22B extends about a portion of the radial bore 12 defined by the retainer 20. This lip 22 provides a stop that prevents the bearing caps 34 from extending outward relative to the center of ring member 10 when the trunnions 32,42 are interconnected therein as shown in FIG. 1B. Though shown as utilizing an integrally formed lip 22, it will be further appreciated that a circumferential groove and snap ring may also be utilized to form a stop in each radial bore 12. What is important is that a stop is formed that prevents the caps 34, 44 from moving outward.

Each radial bore 12 may be sized to apply a predetermined force to the bearing caps 34, 44 when the retainer 20 is sealed with the ring member 10. In this regard, bearing caps 34, 44 may be formed from a drawing process and may not be perfectly cylindrical. That is, the caps 34, 44 may be slightly elongated. In this regard, when a bearing cap 34, 44 is disposed within a radial bore 12, the retainer 20 and ring member 10 may apply a predetermined compressive force to shape these bearing caps 34, 44 when the retainer is tightened (i.e. seated). This compressive force provides for a secure connection between the bearing caps 34, 44 and the respective radial bores 12.

To insure that the retainers 20 do not apply excessive force to the bearing caps 34, 44, the interface surface 50 between each retainer 20 and the ring member 10 includes an alignment lip 52 that limits movement between the retainer 20 and the ring member 10. For example, as shown in FIGS. 2A and 2B, the lip 52 formed on the retainer interface surface 50 is received in a corresponding notch 54 on the mating interface surface of the annular member 10. In this regard, the mating surfaces on each of the retainers 20 and the ring member 10 are shaped to provide a conformal relationship. Furthermore, as shown in FIG. 2B, the lip 52 and the notch 54 prevent over tightening of the retainer 20 relative to the ring member 10, which in turn prevents application of excessive force to the bearing caps 34. It will be appreciated that the lip 52 and notch 54 may also be formed to interlock thereby requiring, for example, a sliding engagement between the retainer 20 and ring member 20.

The ring member 10 is formed in a manner to enhance its load carrying capability while utilizing one or more separable bores. As noted above, first and second pivot axes, A-A' and B-B' are defined by the opposing pairs of bores. As shown, these axes are coplanar. The plane defined by these pivot axes, A-A' and B-B' defines a rotational plane for the ring member 10. As shown in FIG. 2B, it will be noted that at least a portion of the interface surface 50 between each retainer and the ring member 10 is transverse (i.e. non-parallel) with the rotational plane of the ring member 10. In this regard, when torque is applied by one of the trunnion yokes, 30, 40 to the ring member 10, as shown by arrow labeled F in FIG. 2B, the force is transmitted through the continuous ring member 10. As will be appreciated, if the interface surfaces were coplanar or parallel with the rotational plane of the ring member 10, the force would be directed along the interface surface and concentrated within the bolts 24 interconnecting the retainer 20 to the ring member 10. That is, the at least partially transverse design of the interface surface between the retainers 20 and ring member 10 reduces the forces applied to the bolts 24, which are typically the limiting factor in the bearing strength of the ring member 10. Accordingly, the total amount of force transmitted between the first and second shafts may be increased.

In order to facilitate interconnection of the ring member 10 to the trunnion yokes 30, 40 on each shaft 102, 104, each pair of opposing radial bores 12 is accessible from opposite sides of the ring member 10. FIG. 2A shows a first embodiment of the ring member 10 utilizing four separable bores 12 and four retainers 20 wherein each opposing pair of radial bores 12 is disposed on opposite sides of the ring member 10. In this regard, the ring member 10 of FIG. 2A may be interconnected to a first shaft and in a first interconnecting step, and interconnected to a second shaft in a separate interconnecting step.

As shown in FIG. 2A, a first pair of the opposing caps 20 may be removed from a first side of the ring member 10 to expose the ring portion of two opposing radial bores 12a and 12b. Accordingly, the trunnions and bearing caps of a trunnion yoke may be disposed within the ring portions of the radial bores 12a and 12b. Once properly seated within the portions of the radial bore 12, a first set of retainers 20 may be interconnected to the ring member 10 thereby securing the trunnion to the ring member 10. See, for example, FIG. 1B. Accordingly, after interconnected to a first trunnion on a first shaft, the retainers 20 on the other side of the ring member 10 may be removed to expose the second set of opposing radial bores 12, allowing interconnection of a second trunnion yoke. Again, once the trunnions of that yoke are disposed within the ring portion of the radial bores 12, a second set of opposing caps 20 may be interconnected to the ring member 10 thereby securing the second trunnion yoke to the ring member 10 and interconnecting the first and second shafts 102, 104. Disposing the trunnion yokes 30, 40 within the opposing radial bores as defined by the ring member may further comprise slightly compressing each pair of opposing bearing caps 34, 44 such that the opposing outside surfaces of those bearing caps 34, 44 are seated within the lips 22 formed within each ring portion of the radial bore 12.

Utilization of separable bores 12 having removeable retainers 20 provides an additional benefit. In particular, the individual retainers 20 allow for selectively servicing of bearing caps 34, 44. That is, if a bearing cap 34, 44 becomes worn or otherwise compromised, an individual retainer 20 covering the compromised bearing cap 34, 44 may be removed, allowing the bearing cap to be replaced and the retainer 20 reengaged with the ring member 10. As will be appreciated, this does not necessarily require removing either shaft 102, 104 from the components to which they are attached. That is, individually removeable retainers 20 allow for in-place servicing of the ring joint assembly 100.

Figure 3:
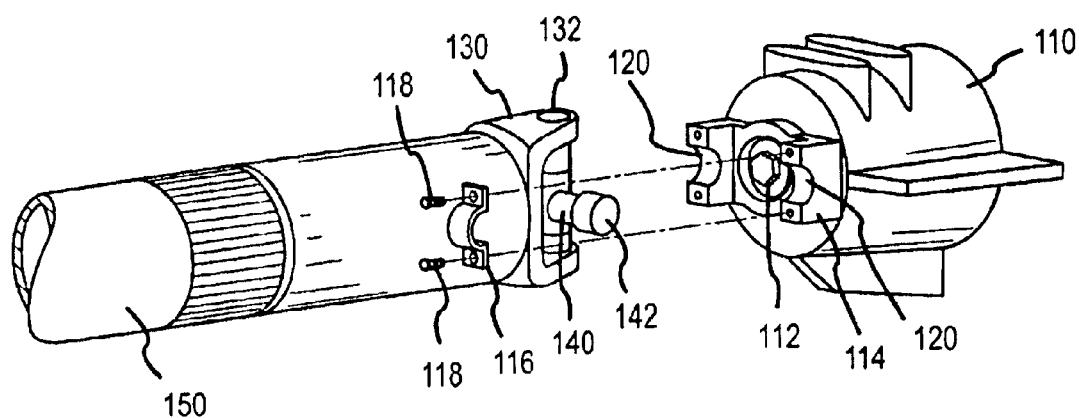
FIG. 3 shows a cruciform joint assembly.

Use of a ring joint assembly 100 allows for increased movement between two interconnection shafts as well as the ability to transfer increased loads therebetween. In this regard, one potential use of the ring joint assembly 100 is the replacement of existing cruciform joint assemblies. For example, as shown in FIG. 3, a cruciform joint assembly 200 is shown for transmitting rotary power from a transmission 110 of an automobile to an output shaft 150 (e.g. a drive line). Typically, the operating angle between the transmission and output shaft 150 is designed to be within an acceptable limit of the cruciform joint assembly 200. However, changes to the suspension of the vehicle caused by worn springs, revisions to driveline components, stretching or shortening the chassis and/or raising or lowering the vehicle, may result in an increased angle between the output shaft 150 and the transmission 110. Accordingly, the cruciform joint assembly 200 may experience increased stress and decreased performance. That is, an increase in the angle between the output shaft 150 and the transmission 110 may result in short component life for the cruciform connecting member 140. Accordingly, in some instances it may be desirable to replace the joint assembly 200 with a ring joint assembly 100.

As shown, the cruciform joint assembly 200 includes a cruciform connector 140 that includes four radially-extending torque transfer elements, each of which includes a bearing cap 142 for receipt within a bore or race. The cruciform connector 140 is interconnectable to a yoke 114, which is interconnected to the transmission 110 via a splined hub bolt assembly 112. Two opposing bearing caps the cruciform joint 140 are interconnectable to the yoke 114 utilizing first and second caps 116 (only one shown) and interconnection bolts 118. The cruciform member 140 is also connected to a slip-yoke 130 that includes first and second opposing bores 132 for receiving opposing bearing caps on the connecting member 140. As shown, opposing bearing caps of the cruciform member 140 are press fit within the opposing bores 132 on the slip-yoke 130. The slip yoke 130 axially receives splines on the output shaft 150 and is capable of limited axial movement relative to the shaft 150 during vehicle operation.

Figure 4:
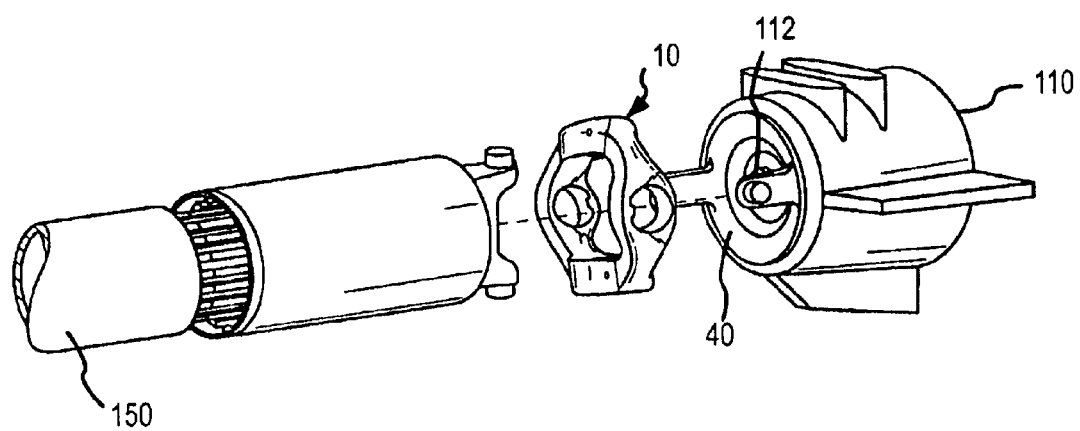
FIG. 4 shows a ring joint assembly.

In order to replace the cruciform joint assembly 200, the interconnection bolts 118 and caps 116 are removed to free the output shaft 150 from the yoke 114. Once the shaft is removed, the hub bolt 112 that interconnects the yoke 114 to the transmission 110 is removed. Accordingly, the yoke 114 is axially retracted from a splined output shaft on the transmission 110 (not shown). Likewise, the slip-yoke 130 is axially removed from the splines 152 on the output shaft 150. This may entail removing one or more sets of screws that limit axial motion of the slip-yoke 130 relative to the shaft 150. Once the cruciform joint components are removed, a trunnion yoke 40 having radially extending torque transfer elements is interconnected to the transmission. That is, internal splines within the trunnion yoke slide over the splined shaft on the transmission 110. The trunnion yoke 40 is secured in place using the hub bolt 112. Likewise, a slip-yoke with opposing trunnions is engaged with the splines 152 on the output shaft 150. Accordingly, each of the radially extending trunnions 34, 44 on each of the yokes 40, 70 is engaged within a bearing cap 34, 44. Accordingly, each of the trunnion yokes 40, 70 are individually interconnected to the ring member 10 as above described. See FIG. 4.

Figure 5:
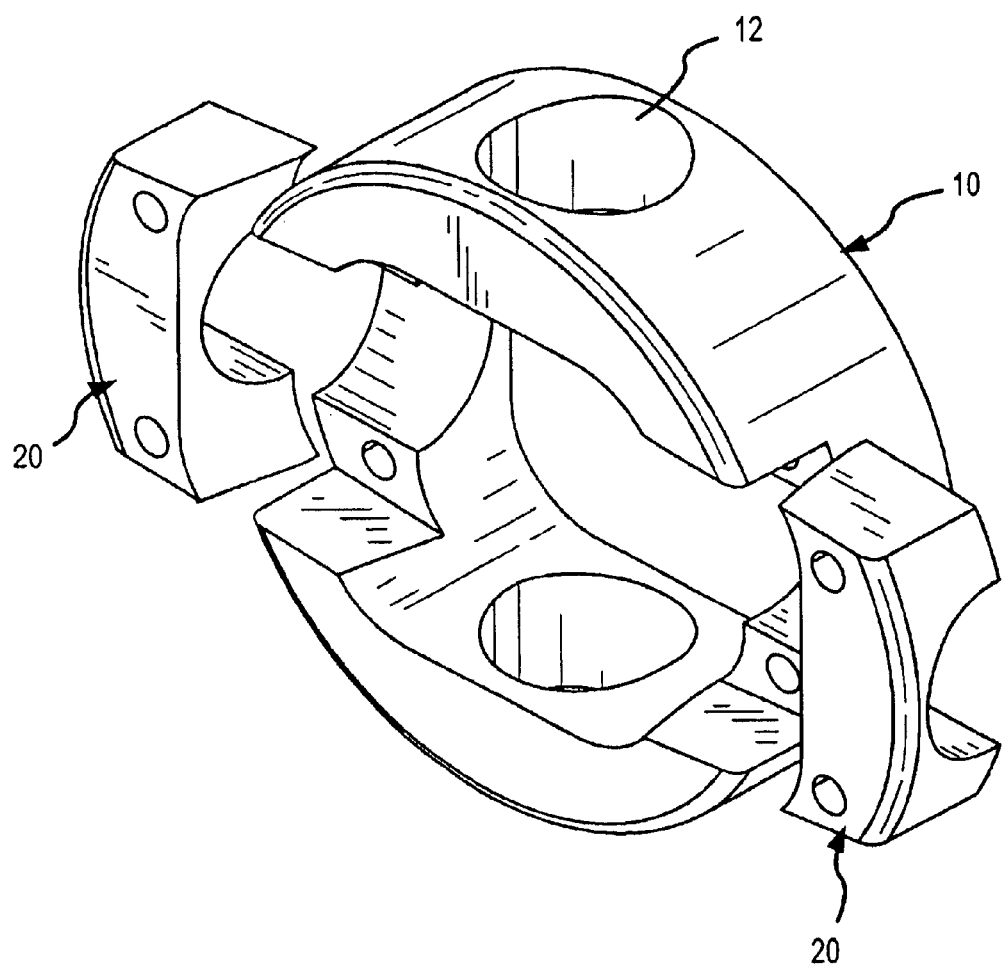
FIG. 5 shows a perspective view of a second embodiment of the invention.

The embodiments described above are for exemplary purposes only and is not intended to limit the scope of the present invention. Various adaptations, modifications and extensions of the described apparatus will be apparent to those skilled in the art and are intended to be within the scope of the invention as defined by the claims which follow. By way of example, FIG. 5 shows a second embodiment of the ring member 10 that utilizes one or more of the aspects discussed above. In this embodiment, only one pair of the radial bores 12 contain removeable retainers 20 while a second set of radial bores are integrally formed within the ring member 10. As above, at least a portion of the interface surface between the retainer 20 and ring member 20 is perpendicular to the rotational plane of the ring member 20.

What is claimed is:

1. A ring apparatus to interconnect first and second shafts for rotation, comprising:
   a continuous annular member, said member at least partially defining first and second pairs of opposing radial bores, wherein a first axis is defined by said first pair of opposing radial bores and a second axis is defined by said second pair of opposing radial bores are transverse;
   a first retainer interconnectable to a first side of said annular member, wherein said first retainer and said annular member in combination define one bore of said first pair of opposing radial bores;
   a second retainer interconnectable to a second side of said annular member, wherein said second retainer and said annular member in combination define one bore of said second pair of opposing radial bores wherein each said retainer forms at least one interface surface with said annular member and wherein for each said interface surface at least one projection formed on one of said retainer and said annular member extends across said interface surface into a mating recess formed within the other of said retainer and annular member.

2. The apparatus of claim 1, wherein a second bore of at least one of said first and second pairs of opposing radial bores is entirely defined by said annular member.

3. The apparatus of claim 1, further comprising:
   third and fourth retainers interconnectable to said first and second sides of said annular member, respectively, wherein said third and fourth retainers in combination with said annular member define a second bore of each of said first and second pairs of opposing radial bores, respectively.

4. The apparatus of claim 1, wherein said first and second axes are perpendicular.

5. The apparatus of claim 1, wherein said first and second axes are co-planar.

6. The apparatus of claim 1, wherein each said bore is substantially cylindrical for receiving a cylindrical element.

7. The apparatus of claim 6, wherein each said cylindrical bore has a reduced diameter around at least a portion of its circumference at a first position along its length.

8. The apparatus of claim 7, wherein each said cylindrical bore contains circumferential recess, said recess sized to receive a retaining element.

9. The apparatus of claim 7, wherein each said reduced diameter around at least a portion of said cylindrical bore at an outward edge of said bore as measured from the center of said annular member.

10. The apparatus of claim 1, wherein each said retainer forms up to half of each said radial bore.

11. The apparatus of claim 10, wherein each said retainer forms at least one interface surface with said annular member.

12. The apparatus of claim 11, wherein said interface surfaces is at least partially transverse to a plane of rotation of said annular member.

13. The apparatus of claims 1, wherein said at least one projection and mating recess are operative to align said retainer and said annular member for interconnection.

14. The apparatus of claim 1, further comprising:
   a mechanical fastener for interconnecting said retainer to said annular member.

15. The apparatus of claim 1, wherein said mechanical fastener is selectively removable allowing said retainer to be selectively disconnected from said annular member.

16. A ring apparatus to interconnect first and second shafts for rotation, comprising:
   a continuous annular member, said member at least partially defining first and second pairs of opposing radial bores, wherein said first and second pairs of opposing radial bores define first and second axes substantially common plane;
   a plurality of retainers interconnectable to said annular member, wherein each said retainer forms a first portion of one of said bores and said annular member forms a second portion of said bore;
   a first abutting surface formed on each said retainer; and
   a second abutting surface formed on said annular member, wherein said first and second abutting surfaces abut upon interconnection of each said retainer to said annular member to advancement of said each retainer in a direction perpendicular to said common plane.

17. The apparatus of claim 16, wherein at least a portion of an interface surface between said retainer and said annular member is transverse to said common plane.

18. The apparatus of claim 16, further comprising:
   at least one projection integrally formed on one of said retainer and said annular member and a mating recess integrally formed within the other of said retainer and said annular member.

19. The apparatus of claim 18, wherein said at least one projection extends across an interface surface between said retainer and said annular member and is received within said recess when said retainer is interconnected to said annular member.

20. The apparatus of claim 16, wherein both bores of one of said first and second pairs of opposing radial bores are entirely defined by said annular member.

21. The apparatus of claim 16, wherein both bores of one of said first and second pairs of opposing radial bores include an interconnectable retainer.

22. The apparatus of claim 16, further comprising:
   first and second retainers associated with said first and second pairs of opposing radial bores, wherein said first and second retainers are interconnectable to opposite sides of said annular member.

23. The apparatus of claim 16, wherein said means to limit advancement further comprises a first abutting surface associated with said retainer and a second abutting surface associated with said annular ring, wherein said first and second abutting surfaces abut to prevent advancement of said retainer beyond a predetermined position relative to said annular member.

24. A ring apparatus to interconnect first and second shafts for rotation, comprising:
   a continuous annular member, said member at least partially defining first and second pairs of opposing radial bores; and
   a retainer interconnectable to said annular member, wherein said retainer forms a first portion of one of said bores and said annular member forms a second portion of said bore;
   at least one projection integrally formed on one of said retainer and said annular member; and
   a mating recess integrally formed within the other of said retainer and said annular member, wherein said projection and recess engage to prevent advancement of said retainer beyond a predetermined position relative to said second portion of said bore defined by said annular member.

25. The apparatus of claim 24, wherein each said bore is defined in part by a separate retainer interconnectable to said annular member.

26. The apparatus of claim 24, wherein said at least one projection extends across an interface surface between said retainer and said annular member and is received within said recess when said retainer is interconnected to said annular member.

* * * * *

UNITED STATES PATENT AND TRADEMARK OFFICE
CERTIFICATE OF CORRECTION

PATENT NO. : 6,878,068 B2
DATED : April 12, 2005
INVENTOR(S) : Bigelow et al.

It is certified that error appears in the above-identified patent and that said Letters Patent is hereby corrected as shown below:

Column 11,
Line 21, after "substantially", insert -- in a --;
Line 32, after "to", insert -- limit --.

Signed and Sealed this

Twenty-sixth Day of July, 2005

JON W. DUDAS
*Director of the United States Patent and Trademark Office*